US012521303B1

(12) United States Patent
Xu

(10) Patent No.: US 12,521,303 B1
(45) Date of Patent: Jan. 13, 2026

(54) ELASTICALLY-DRIVEN MASTURBATION CUP MECHANISM

(71) Applicant: Haiting Xu, Jiangxi (CN)

(72) Inventor: Haiting Xu, Jiangxi (CN)

( * ) Notice: Subject to any disclaimer, the term of this patent is extended or adjusted under 35 U.S.C. 154(b) by 0 days.

(21) Appl. No.: 18/772,345

(22) Filed: Jul. 15, 2024

(51) Int. Cl.
*A61H 19/00* (2006.01)

(52) U.S. Cl.
CPC ..... *A61H 19/32* (2013.01); *A61H 2201/0157* (2013.01); *A61H 2201/1215* (2013.01); *A61H 2201/5007* (2013.01)

(58) Field of Classification Search
None
See application file for complete search history.

(56) References Cited

U.S. PATENT DOCUMENTS

2018/0021212 A1* 1/2018 Matsuura ............ A61H 9/0057 600/38

FOREIGN PATENT DOCUMENTS

CN 104622677 A 5/2015

* cited by examiner

*Primary Examiner* — Christine H Matthews
(74) *Attorney, Agent, or Firm* — Westbridge IP LLC

(57) ABSTRACT

An elastically-driven masturbation cup mechanism includes a shell and a soft body, a locating cavity is disposed at the upper end of the shell, a soft driving part is disposed at the bottom of the locating cavity, a driving apparatus is disposed in the shell, the driving apparatus may drive the soft driving part to perform a preset action, the soft body is provided with a channel for the penis to extend into, the soft body is mounted in the locating cavity, and the bottom of the soft body is directly or indirectly matched with the soft driving part through an intermediate piece.

8 Claims, 5 Drawing Sheets

ELASTICALLY-DRIVEN MASTURBATION CUP MECHANISM

TECHNICAL FIELD

The present application relates to the field of masturbation cups, in particular to an elastically-driven masturbation cup mechanism.

BACKGROUND

An existing masturbation cup generally adopts match of a guide rail structure and a sliding block to further realize reciprocating expansion and contraction of the masturbation cup, thereby realizing stimulation to sensitive parts of the penis.

However, in actual experience, because the masturbation cup has a large size, its overall movement requires a relatively stable power to ensure the stability of expansion and contraction. When acting force of expansion and contraction is large, counter-acting force acting on a shell is also large, so the use experience is influenced (even the problem that the shell is separated from the hand may occur), and meanwhile, if a soft body of the masturbation cup reciprocates, the experience feeling of simulating a human body is poor.

SUMMARY

A main objective of the present application is to provide an elastically-driven masturbation cup mechanism, aiming at realizing stimulation of a soft body of the masturbation cup to sensitive parts of the penis, meanwhile, the elastically-driven structure may reduce uncomfortable feeling caused by rigid stress, and its use more tends to simulate the vagina of a human body, so the experience feeling is improved.

In order to realize the purpose, the present application provides an elastically-driven masturbation cup mechanism, which includes a shell and a soft body.

A locating cavity is disposed at the upper end of the shell, a soft driving part is disposed at the bottom of the locating cavity, a driving apparatus is disposed in the shell, and the driving apparatus may drive the soft driving part to perform a preset action.

The soft body is provided with a channel for the penis to extend into, the soft body is mounted in the locating cavity, the bottom of the soft body is directly or indirectly matched with the soft driving part through an intermediate piece, and the bottom of the soft body is forced to deform at a preset frequency.

The driving apparatus is connected with an electronic element, the electronic element includes a power supply and a Printed Circuit Board (PCB) connected with the power supply, the PCB is provided with a control apparatus, and the control apparatus is connected with the driving apparatus to control the state of the driving apparatus.

In actual design, the soft driving part may drive the bottom of the soft body to deform so as to drive the bottom of the soft body to deform at a preset frequency (its swing amplitude is small and may be understood as flapping), and when the penis extends into the channel and the sensitive part of the penis is in contact with the bottom end of the channel, the soft driving part drives the bottom of the soft body to deform under the driving of the driving apparatus so as to apply stimulation at the preset frequency to the sensitive part, so that the use experience is effectively improved.

Its size may adopt a small-size structure according to actual requirements, for example, only the sensitive part is stimulated, and meanwhile, the soft body may also adopt a structure that the soft body is totally covered. Meanwhile, the soft driving part has small counter-acting and has elasticity, so that rigid contact caused by direct driving is reduced, the comfort level is better, and better simulation to the vagina of a human body is realized.

Figure 1:
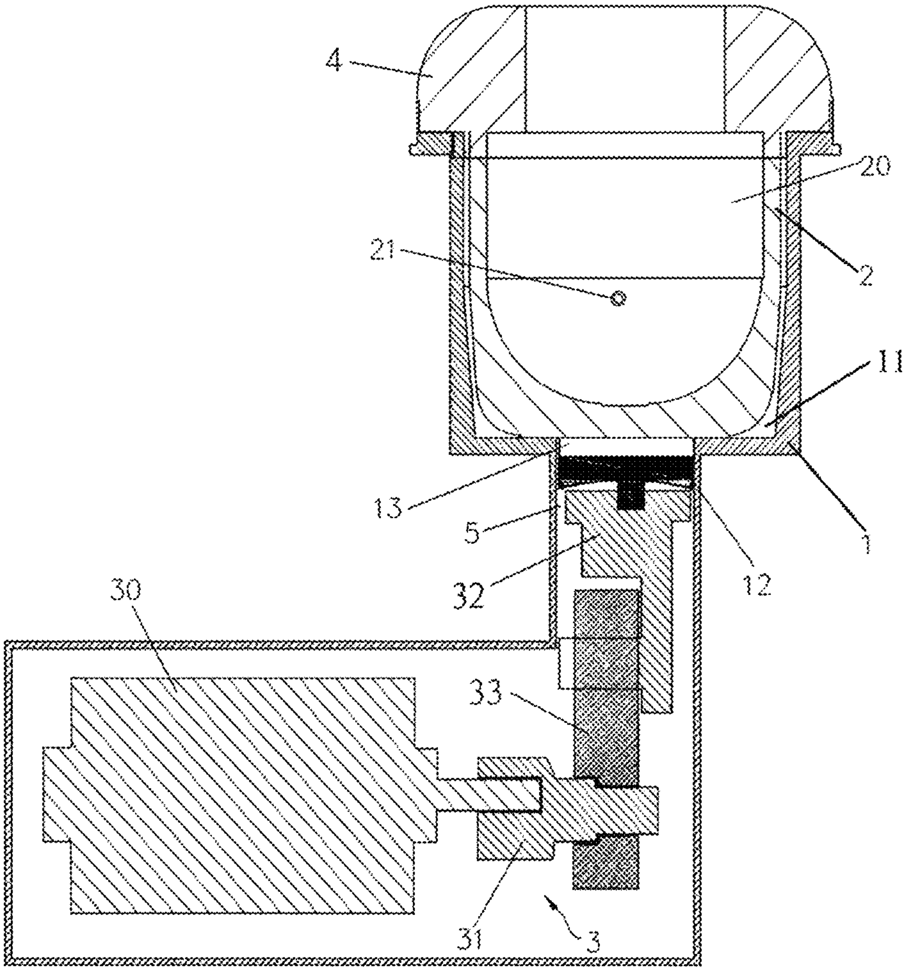
FIG. 1 is a schematic diagram of the present application when a soft driving part is a film.
Figure 2:
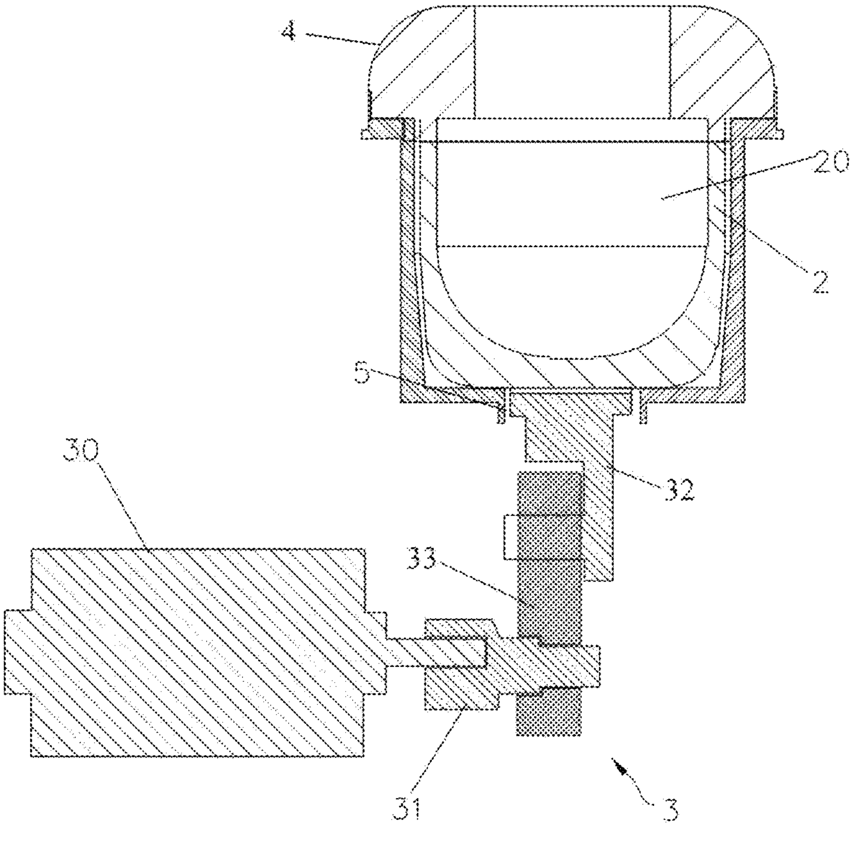
FIG. 2 is a schematic diagram of the present application when a soft driving part and a soft body are integrated.
Figure 3:
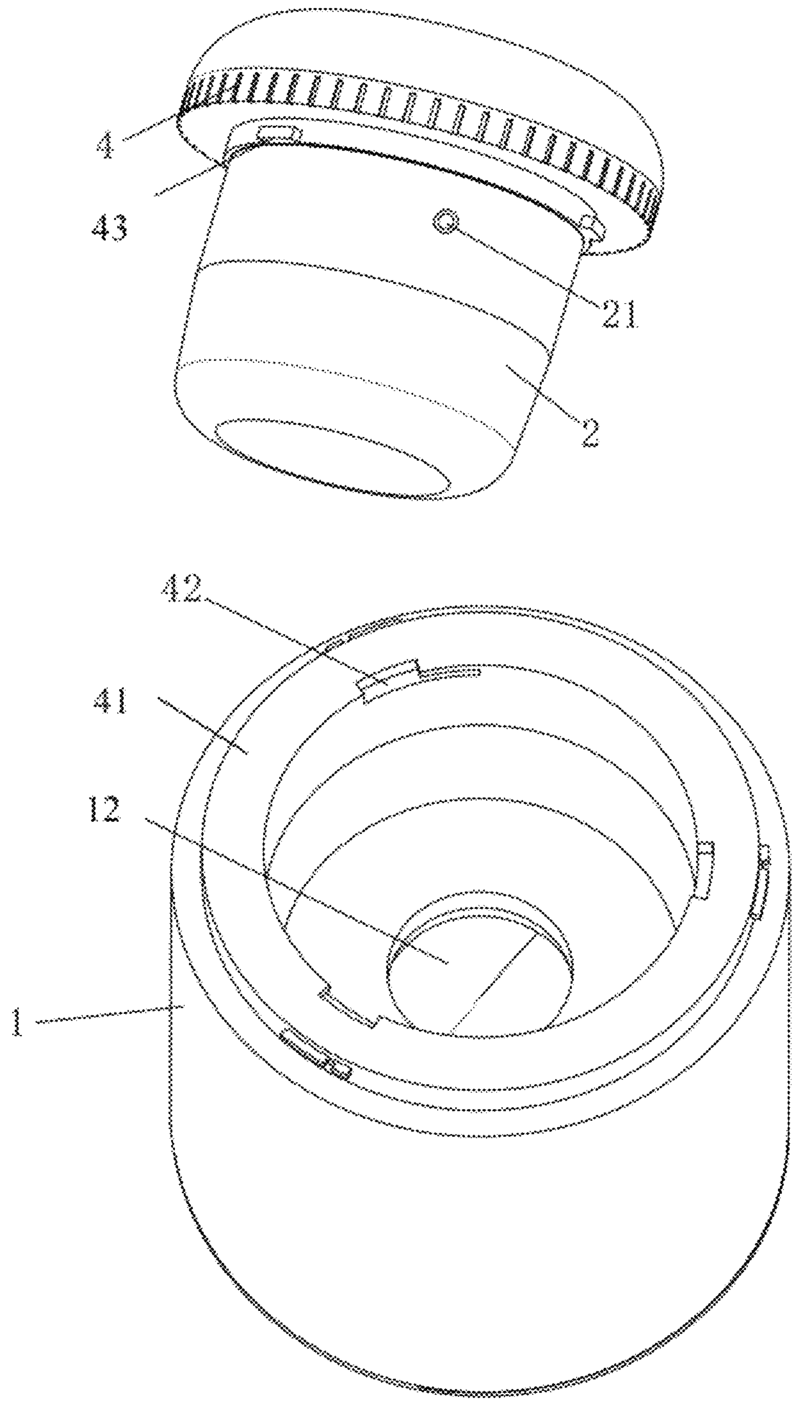
FIG. 3 is a schematic diagram when a shell and a soft body may be detached.
Figure 4:
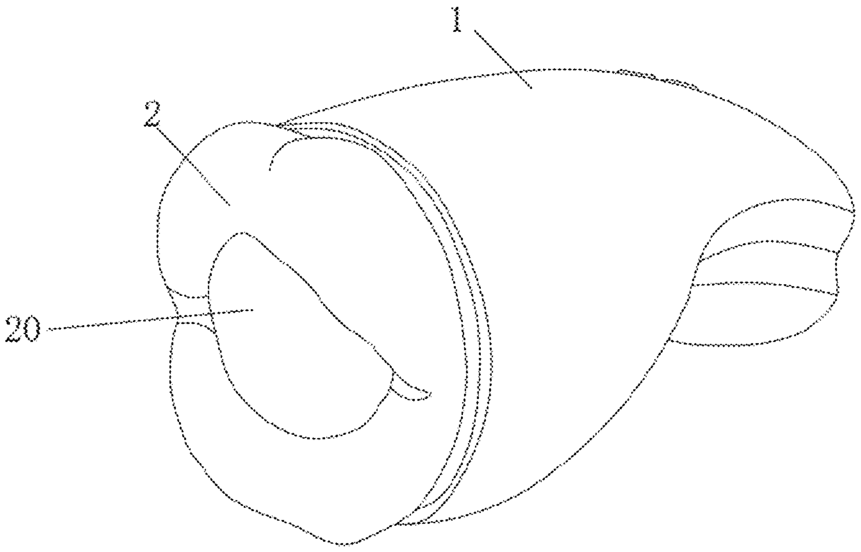
FIG. 4 is a schematic diagram of a three-dimensional view of the present application.

1. Shell, 11. Locating cavity, 12. Soft driving part, 13. Hollow cavity,
2. Soft body, 20. Channel, 21. Air hole,
3. Driving apparatus, 30. Rotating motor, 301. Driving shaft, 31. Eccentric cam, 32. Push part, 33. Coupling shaft,
4. Hard clamping ring, 41. Locating part, 42. Clamping groove,
5. Guide groove;

61. Guide hole, and 62. Guide rod.

DETAILED DESCRIPTION OF THE EMBODIMENTS

The technical solutions in the embodiments of the present application will be clearly and completely described below in combination with the drawings, and it is apparent that the described embodiments are not all but part of the embodiments of the present application. All other embodiments obtained by those of ordinary skill in the art on the basis of the embodiments in the present application without creative work shall fall within the scope of protection of the present application.

It is to be noted that if the embodiments of the present application contain directional indications (such as up, down, left, right, front, back, top, bottom, inside, outside, vertical, transverse, longitudinal, counterclockwise, clockwise, circumferential, radial, axial . . . ), the directional indications are only used to explain the relative position relationship and motion between the components under a specific attitude (as shown in the attached figures). If the specific attitude changes, the directional indication will change accordingly.

In addition, if there is a description of "first" or "second" in the embodiments of the present application, the description of "first" or "second" is only adopted for description and should not be understood to indicate or imply relative importance or implicitly indicate the number of indicated technical features. Therefore, a feature defined by "first" and "second" may explicitly or implicitly indicate inclusion of at least one such feature. In addition, the technical solutions among the embodiments can be combined with each other, but must be based on implementation of those of ordinary skill in the art. When the combination of technical solution is contradictory or impossible to implement, it shall be considered that such combination of the technical solution does not exist and is not within the scope of protection of the present application.

As shown in FIGS. 1-5, an elastically-driven masturbation cup mechanism includes a shell and a soft body.

A locating cavity is disposed at the upper end of the shell, a soft driving part 12 is disposed at the bottom of the locating cavity, a driving apparatus 3 is disposed in the shell, and the driving apparatus 3 may drive the soft driving part 12 to perform a preset action.

The soft body 2 is provided with a channel 20 for the penis to extend into, the soft body 2 is mounted in the locating cavity, the bottom of the soft body 2 is directly or indirectly matched with the soft driving part 12 through an intermediate piece, and the bottom of the soft body 2 is forced to deform at a preset frequency (of course, it may also not deform, for example, the bottom of the soft body is flapped through the driving part).

In actual design, the soft driving part 12 may drive the bottom of the soft body 2 to deform so as to drive the bottom of the soft body 2 to deform at a preset frequency (its swing amplitude is small), and when the penis extends into the channel 20 and the sensitive part of the penis is in contact with the bottom end of the channel 20, the soft driving part 12 drives the bottom of the soft body 2 to deform under the driving of the driving apparatus 3 so as to apply stimulation at the preset frequency to the sensitive part, so that the use experience is effectively improved.

Its size may adopt a small-size structure according to actual requirements, for example, only the sensitive part is stimulated, and meanwhile, the soft body 2 may also adopt a structure that the soft body 2 is totally covered. Meanwhile, the soft driving part 12 has small counter-acting and has elasticity, so that rigid contact caused by direct driving is reduced, the comfort level is better, and better simulation to the vagina of a human body is realized.

Particularly, when the end part of the penis is in contact with the bottom end of the channel, the soft structure has support, and the flapping motion energy of the soft driving part may act on the soft body and is transmitted to the sensitive point of the penis.

The driving apparatus is connected with an electronic element, the electronic element includes a power supply (the power supply may be a lithium battery or a connecting power bank or a connecting power line), and a PCB connected with the power supply, the PCB is provided with a control apparatus, and the control apparatus is connected with the driving apparatus to control the state of the driving apparatus.

Specifically, the soft body 2 is fixedly disposed in the locating cavity 11. For example, glue or a buckling structure may be adopted, and with the adoption of the soft body 2 in the fixed structure, wear may be reduced, so that the service life is prolonged.

In the embodiment of the present application, the soft body 2 is detachably disposed in the locating cavity 11. Therefore, the washing and replacement of the soft body 2 are facilitated, for example, the soft body 2 with different inner wall structures is replaced to achieve different stimulation effects.

Specifically, a hard clamping ring 4 is disposed at the upper part of the soft body 2, and a locating part 41 matched with the hard clamping ring 4 is disposed at the opening position of the locating cavity 11.

The locating part 41 is provided with clamping grooves 42 arranged at intervals along its periphery, and the hard clamping ring 4 is provided with a clamping part 43 matched with the clamping groove 42. In actual mounting, by twisting the hard clamping ring 4, the clamping part 43 is driven to be clamped in the clamping groove 42 or separated from the clamping groove 42, so that the detachable disposing of the soft body 2 is realized.

Specifically, a clamping hoop may also be disposed at the opening position of course, so that mounting fixing of the soft body 2 is realized.

In the embodiment of the present application, the driving apparatus 3 includes a rotating motor 30, an eccentric cam 31 connected with the driving end of the rotating motor, and a push part 32 mounted to the locating cavity in a sliding manner, the push part and the eccentric cam are connected through the coupling shaft 33, two ends of the coupling shaft are respectively connected with the push part and the eccentric cam in a pivoting manner, and the push part is connected with the soft driving part 12. Through arrangement of the coupling shaft and the eccentric cam, a rotating stroke is converted into a horizontal sliding stroke, which drives the soft driving part 12 to perform a preset deformation, in a preferred embodiment, the rotating motor is vertically disposed, and the eccentric cam, the coupling shaft and the push part are horizontally disposed.

Specifically, the soft driving part 12 may be defined as a film disposed at the bottom of the locating cavity 11, and a hollow cavity 13 is disposed between the soft body 2 and the film. When the film performs preset deformation, since the hollow cavity 13 is disposed between the soft body 2 and the film, correspondingly, the swing of the film may form negative pressure in the hollow cavity 13, so that the bottom of the soft body 2 is driven to perform elastic deformation at preset frequency, then stimulation is applied to the sensitive part of the penis, with adoption of the non-contact driving mode, the simulation effect more tends to the vagina of the human body, soft touch is realized, of course, in order to achieve a simulation effect, a heating apparatus may also be disposed in the locating cavity 11, so that comprehensive experience is improved.

Specifically, the soft driving part 12 and the bottom of the soft body 2 are integrally disposed, and the push part directly drives the bottom of the soft body 2 to perform preset deformation. In actual design, the soft driving part 12 and the bottom of the soft body 2 are integrally designed, correspondingly, the thickness of the bottom of the soft body 2 is relatively large, so that the problem of hard contact cannot occur, the power is more stable and direct, the stimulation effect is higher than the deformation frequency of the structure of the hollow cavity 13, it is applicable to a user with a high requirement on stimulation, and design differentiation is realized.

Preferably, the push part is made of a material with small deformation degree.

Specifically, an air hole 21 is disposed in the wall face of the soft body 2 in a penetrating manner, and the air hole 21 communicates with the locating cavity. When the penis extends into the channel 20, the channel 20 is in a relatively closed state, correspondingly, the locating cavity may form negative pressure, when the negative pressure is larger than a preset value, the deformation of the soft body 2 may be reduced, which affects the stimulation effect, therefore, with the arrangement of the air hole 21, the circulation of a fluid may be effectively realized, and then the stimulation effect of the soft body 2 is improved.

In the embodiment of the present application, a guide grove 5 is disposed at the position, located at the push part, of the shell 1, the guide groove and the push part are matched in shape (of course, a gap may also be disposed, or structures such as a sliding guide bearing may be disposed), and the push part may slide along the length direction of the guide groove. The reciprocating sliding of the push part is guaranteed, preferably, the push part is made of a hard material, and therefore, the reciprocating deformation of the soft driving part 12 (integrated or provided with a hollow cavity 13) is more stable.

Specifically, the rotating motor is vertically disposed, the eccentric cam, the coupling shaft and the push part are horizontally disposed, a longer stroke may be realized, and then the deformation is larger.

Figure 5:
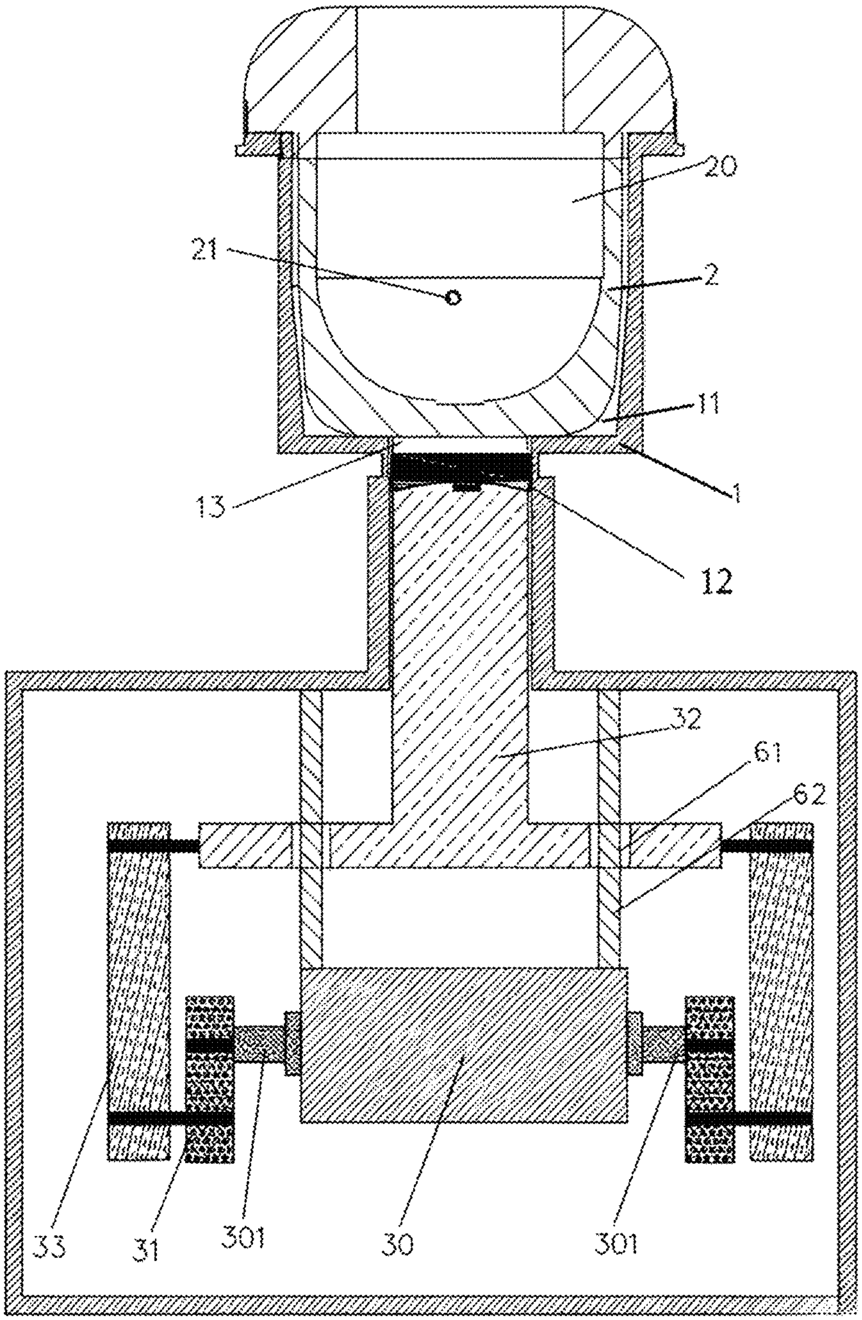
FIG. 5 is a schematic structure diagram of a two-shaft rotating motor.

In another embodiment, as shown in FIG. 5, the rotating motor 30 is a two-shaft rotating motor, driving shafts 301 are disposed at two ends of the two-shaft rotating motor, two groups of eccentric cams and two groups of coupling shafts are available, and the upper ends of the two groups of coupling shafts are connected with the lower part of the push part in a pivoting manner.

The push part is further provided with a guide hole 61, and the locating cavity is provided with a guide rod 62 matched with the guide hole.

The above description is preferred embodiments of the present application, and is not intended to limit the scope of the present application, under the invention concept of the present application, the equivalent structural transformation performed by using the contents of the specification and the drawings of the present application, or directly or indirectly applied to other related technical fields, are included in the scope of the present application.

What is claimed is:

1. An elastically-driven masturbation cup mechanism, comprising:

a shell, wherein a locating cavity is disposed at an upper end of the shell, a soft driving part is disposed at a bottom of the locating cavity, a driving apparatus is disposed in the shell, and the driving apparatus may drive the soft driving part to perform a preset action; and a soft body, which is provided with a channel for a penis to extend into, wherein the soft body is mounted in the locating cavity;

wherein the driving apparatus is connected with an electronic element, the electronic element comprises a power supply and a printed circuit board (PCB) connected with the power supply, wherein the driving apparatus comprises a rotating motor, an eccentric cam connected with a driving end of the rotating motor, and a push part made of a hard material and mounted in a guide groove in a sliding manner, wherein the push part and the eccentric cam are connected through a coupling shaft, two ends of the coupling shaft are respectively connected with the push part and the eccentric cam in a pivoting manner, and the push part is connected with the soft driving part;

wherein the soft driving part is defined as a film disposed at the bottom of the locating cavity, and a hollow cavity is disposed between the soft body and the film; and when the film performs preset deformation, the hollow cavity is disposed between the soft body and the film.

2. The elastically-driven masturbation cup mechanism according to claim 1, wherein the soft body is fixedly disposed in the locating cavity, or the soft body is detachably disposed in the locating cavity.

3. The elastically-driven masturbation cup mechanism according to claim 2, wherein a hard clamping ring is disposed at an upper part of the soft body, and a locating part matched with the hard clamping ring is disposed at an opening position of the locating cavity;

the locating part is provided with clamping grooves arranged at intervals along a periphery of the locating part, and the hard clamping ring is provided with a clamping part matched with the clamping grooves.

4. The elastically-driven masturbation cup mechanism according to claim 1, wherein the soft driving part and a bottom of the soft body are integrally disposed, and the push part directly drives the bottom of the soft body to perform the preset deformation.

5. The elastically-driven masturbation cup mechanism according to claim 1, wherein an air hole is disposed in a wall face of the soft body in a penetrating manner, and the air hole communicates with the locating cavity.

6. The elastically-driven masturbation cup mechanism according to claim 1, wherein the push part is located within the guide groove and the push part slides along a length direction of the guide groove.

7. The elastically-driven masturbation cup mechanism according to claim 1, wherein the rotating motor is vertically disposed, and the eccentric cam and the push part are horizontally disposed.

8. The elastically-driven masturbation cup mechanism as claimed in claim 1, wherein the rotating motor is a shaft rotating motor, driving shafts are disposed at two ends of the shaft rotating motor, an upper end of the coupling shaft is connected with a lower part of the push part in a pivoting manner, and the push part is further provided with a guide hole and the driving apparatus further comprises a guide rod matched with the guide hole.

* * * * *